United States Patent [19]
Curreri et al.

[11] Patent Number: 6,091,896
[45] Date of Patent: *Jul. 18, 2000

[54] DEBUGGING OPTIMIZED CODE USING DATA CHANGE POINTS

[75] Inventors: Donald L. Curreri, Woburn, Mass.; Arun K. Iyengar, Yorktown Heights, N.Y.; Russell A. Biesele, Santa Clara; Michelle A. Ruscetta, San Jose, both of Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,364

[22] Filed: Dec. 22, 1995

[51] Int. Cl.[7] ...................................................... G06F 11/00
[52] U.S. Cl. ............................ 395/704; 395/705; 395/709
[58] Field of Search ................................... 395/704, 705, 395/709

[56] References Cited

U.S. PATENT DOCUMENTS

| | | | |
|---|---|---|---|
| 4,953,084 | 8/1990 | Meloy et al. | 364/200 |
| 5,191,646 | 3/1993 | Naito et al. | 395/161 |
| 5,265,254 | 11/1993 | Blasciak et al. | 395/700 |
| 5,301,198 | 4/1994 | Kawasaki | 371/19 |
| 5,339,431 | 8/1994 | Rupp et al. | 395/700 |
| 5,371,747 | 12/1994 | Brooks et al. | 371/19 |
| 5,446,900 | 8/1995 | Kimelman | 395/700 |
| 5,533,192 | 7/1996 | Hawley et al. | 395/183.04 |
| 5,555,419 | 9/1996 | Arsenault | 395/700 |
| 5,652,909 | 7/1997 | Kodosky . | |
| 5,812,850 | 9/1998 | Wimble | 395/704 |

OTHER PUBLICATIONS

A. Iyengar, et al, "An Event–Based, Regargetable Debugger", Hewlett–Packard Journal, pp. 33–43, Dec. 1994.

"Borland Turbo Debugger User's Guide 2.5" pp. 123–126, 1988, 1991.

P. T. Zellweger, "Interactive Source–Level Debugging of Optimized Programs", Xerox Corporation, Palo Alto Research Center, CSL–84–5, May 1984.

M. Copperman, "Debugging Optimized Code Without Being Mislead", University of California at Santa Cruz, UCSC–CRL–93–21, Jun. 11, 1993.

*Primary Examiner*—Alvin Oberley
*Assistant Examiner*—Sue Lao
*Attorney, Agent, or Firm*—Scott K. Peterson

[57] ABSTRACT

A software development system with improved facilities for debugging optimized code. Certain parts of the operations specified by source statements are categorized as "data change points". A compiler 102 identifies the correspondence between the machine instructions that perform data change point operations and the source statements from which these machine instructions were derived and stores this mapping data 110 for use by a debugger program 104. This source code/machine instruction mapping data is used by the debugger to permit users to specify machine instruction locations (such as for setting breakpoints) by identifying a source statement and specifying that the debugger use the data change point of that statement; as another example, the step command includes an option that permits a user to continue execution until the next data change point instruction is reached. The debugger's source code display (FIGS. 5A and 5B) is also adapted to take advantage of the data change point mapping data: a user can request that the debugger highlight source statements for which the data change point instruction has executed; in marking the source display to indicate the location of the current execution point, the debugger can also show whether the next instruction to execute will be a data change point instruction.

20 Claims, 2 Drawing Sheets

DEBUGGING OPTIMIZED CODE USING DATA CHANGE POINTS

FIELD OF THE INVENTION

The present invention relates to tools for software development. In particular, it relates to improvements to facilitate debugging software that has been processed by an optimizing compiler.

BACKGROUND

Trends in computer design and associated compiler technology have increased the importance of optimization in program translation. In addition, it is anticipated that, with future computer architectures, optimization will play an increasingly important role; in some cases, an unoptimized translation may not even be available. Thus, there is a growing need to be able to debug optimized code.

Computer programmers typically create computer programs by writing the programs in a form that can not be directly executed by the computer on which the program is intended to operate (the target machine). This form of the program, known as source code, is then translated into instructions that the target machine can directly execute (known as object code or machine instructions). While there are various stages and types of such translation and types of tools for such translation (such as, compilers, assemblers, linkers), for the purpose of the present application, these tools are all subsumed within the term "compiler".

Software development typically involves an iterative process in which a programmer repeatedly goes through the process of making changes in source code and observing the program's behavior as it is executed. To observe the program's behavior, a programmer generally uses a tool or collection of tools known as a debugger.

A programmer often uses a debugger in the following cycle: (1) stop program execution at some potentially useful place; (2) observe program data; (3) formulate hypotheses about the program's behavior; (4) predict the next useful place to stop, and arrange for the program to stop at that place; (5) continue program execution; and (6) repeat these steps as needed.

To support this activity, debuggers typically provide a range of facilities for controlling execution of the program being "debugged" and for observing program data and other state information in the target machine that is executing the program being debugged.

For example, debuggers typically permit a user of the debugger to step program execution one machine instruction at a time or one source statement at a time. Also, debuggers typically provide a breakpoint facility, whereby a user can specify one or more points in the program at which the debugger will stop program execution when any of these points is reached.

Some debuggers provide facilities for stopping program execution based on changes in program variables. For example, a user of the VS debugger from Wang Laboratories can tell the debugger to stop at the next statement that modifies a specified variable. Other debuggers provide a "watch variable" capability: after every instruction or statement, the debugger tests the specified variable, and stops execution when the variable has been changed. Other systems use hardware support to detect when specified memory locations are accessed, thereby permitting breakpoints to be set based on access to program data.

Debuggers often present a visual display of the source code containing the target program's current point of execution, with the portion of source code (line, statement, expression, or some other source construct) that is about to execute being visually designated in some way. Such source-level debuggers generally also permit a user to specify locations in the machine code by referring to the source code.

With straightforward compilation, each source statement is translated into a number of contiguous machine instructions; this results in a one-to-one correspondence between a source statement and a group of machine instructions. By exploiting this simple source code/machine instruction relationship, a debugger can present to the programmer the illusion that the target machine is executing the source code. For example, a request by a programmer to set a breakpoint at a particular source statement has a well-defined interpretation in terms of where in the machine instructions to set the breakpoint. Further, in this situation, a programmer can assume that all machine instructions derived from one source statement all execute before any instructions derived from another source statement, and that the machine instructions execute in the same order that the source statements are intended to execute under any set of inputs.

In order to enhance the quality (speed and/or size) of the machine code generated by compilers, compilers have been enhanced such that the machine code that they generate no longer bears a simple relationship to the source code, such as the following: several noncontiguous machine instructions may be derived from a single source statement; a single machine instruction may correspond to several noncontiguous source statements; some source statements may be eliminated completely. Such compilers are typically known as optimizing compilers.

Because of the lack of a one-to-one correspondence between source statements and groups of machine instructions, source level debugging of optimized machine code is more complex. For example, it becomes more difficult for the debugger to accurately indicate the source code equivalent of the current execution point, and it becomes more difficult for a programmer to correctly specify the location of breakpoints.

Because an optimized program's instructions are not necessarily executed in the order that they appear in the source code listing, statements that precede the current execution point in the source code may not have been executed yet. This makes it risky for the programmer to draw conclusions based on observation of the data on which those statements operate.

In some cases, programmers deal with these problems by disabling the compiler's optimization features, and debugging code that has not be optimized. In other cases, programmers resort to debugging the assembly language form of the program (a text counterpart to the numeric values of machine instructions), with little or no debugger support for finding the related source statements.

There is no one "solution" to the challenges of debugging optimized code. Rather, programmers deal with this challenge by using a variety of techniques that help bridge the gap between the programmer's source code and the machine code that is actually executed by a computer.

Debugging of optimized code has been discussed in many references, including: P. T. Zellweger, "Interactive source-level debugging of optimized programs", Xerox Corporation, Palo Alto Research Center, CSL-84-5, May 1984 (extensive discussion of problems inherent in debugging of optimized code; cites many references; also, see pp. 72–76); M. Copperman, "Debugging optimized code without being mislead", University of California at Santa Cruz, UCSC-CRL-93–21, Jun. 11, 1993 (includes a literature survey at pp. 16–22); U.S. Pat. No. 4,953,084, Meloy, et al., "Method and apparatus using variable ranges to support symbolic debugging of optimized code"; U.S. Pat. No. 5,371,747, Brooks, et al., "Debugger program which includes correlation of computer program source code with optimized object code" (cites many non-patent references).

SUMMARY OF THE INVENTION

Data change points of a program are those places in the program that change the state of the abstract machine that the program defines; data change point instructions are those machine instructions that change the state of the abstract machine. For example, in an assignment statement, the data change point corresponds to the instruction that actually performs the assignment.

According to the present invention, a compiler identifies data change points in source code and identifies the machine instructions that correspond to these data change points. Information identifying data change points and the corresponding data change point instructions is then stored in a mapping data structure.

Further, by using the data change point information in the mapping data structure, a debugger includes improved mechanisms for a user to communicate certain information to the debugger and includes improved mechanisms for the debugger to communicate certain information to the user. In working with a debugger, various operations require that the user identify certain machine instructions—for example, instructions that are to be breakpoints. In one aspect of the present invention, a debugger provides mechanisms by which a user can identify such instructions by referring to data change points of source statements. According to another aspect of the invention, a debugger highlights source statements for which the data change points have executed.

Controlling program execution by data change points makes it easier for a programmer to observe particular state changes. For example, such mapping is particularly useful in circumstances where it is hard to find the assignments to certain variables because heavy optimization has moved the assignments around in the program structure.

BRIEF DESCRIPTION OF THE DRAWING

The invention is pointed out with particularity in the appended claims. The above and other advantages of the invention may be better understood by referring to the following detailed description in conjunction with the drawing, in which:

DETAILED DESCRIPTION OF AN ILLUSTRATIVE EMBODIMENT

Figure 1:
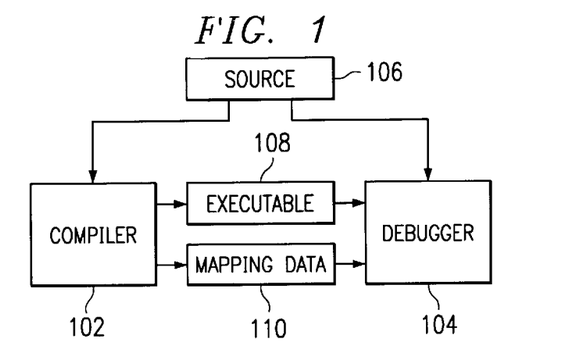
FIG. 1 is a block diagram of some of the components of a software development system.

The invention will be described in detail in the context of an illustrative software development system including a compiler 102 and a debugger 104, as illustrated in FIG. 1. Source code 106 is provided as input to the compiler 102. Based on this source code 106, the compiler 102 generates compiled code 108, which is executable by a target computer system (which may be the same or different from the computer system on which the compiler is executed). In addition to compiled code 108, the compiler generates mapping data 110, which is information relating to the mapping between compiled code and the source code from which it was derived. The compiler stores this information in a mapping data structure (illustrated in FIG. 3) that is then used by the debugger 104.

Figure 6:
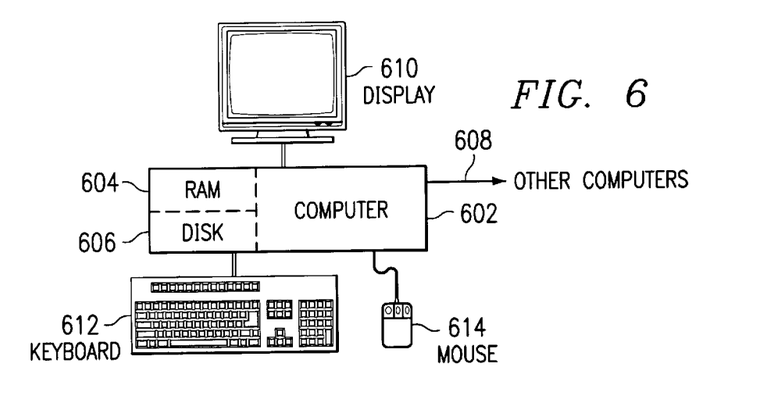
FIG. 6 is a block diagram of the major hardware components of a computer system.

This illustrative software development system is implemented as a set of programs executing on a computer system, such as is illustrated in FIG. 6. The computer system includes: a computer 602, which includes memory for storing programs and data, including main memory 604 and magnetic disk 606; a communication link 608 for connecting to other computers; a display 610 for presenting information to a user of the computer system; a keyboard 612, by which a user can enter commands; and a pointing device, such as a mouse 614, that a user can operate in conjunction with the display to enter commands.

The appearance, organization, and interpretation of source code depends on the language in which it is written. Historically, most programs have been written in text-based languages, such as FORTRAN, COBOL, Pascal, or C. Source code written in these languages appears as lines of text. Computer languages are not limited to those based on text. Graphical techniques can also be used to create programs. Thus, "source code" is not limited to strings of characters.

The illustrative software development system is primarily designed for use with statement-oriented languages; thus, in this illustrative embodiment, data change point instructions are mapped to source statements. However, the software development system could be extended to map data change point instructions to source expressions. Further, one skilled in the art will appreciate that data change point instructions could be mapped to other source constructs, depending upon the characteristics of the source language.

Data Change Points

One can view the process of creating a new program as the process of describing a new virtual machine. From this perspective, compilation can be viewed as the process of mapping an abstract machine onto a existing machine: the source code of a program describes an abstract machine; the compiler maps this abstract machine to an existing machine.

Data change points of a program are those places in the program that change the state of the abstract machine that the program defines. Data change point instructions are those machine instructions that change the state of the abstract machine. The present invention identifies these data change point instructions and associates them with the particular portions of source code from which they were derived.

Another way of viewing this data change point mapping is the following. At various points in the execution of the machine instructions that are the executable form of a program there is a state change that can be mapped back to a change that is represented in the source code form of the program—in other words, this is a state change that is "visible" at the source code level. The data change point mapping is the mapping between the instruction that performed this particular state change and the portion of the source code in which this state change appears.

For example, the following simple assignment statement involves some address computation, operand fetching, subexpression computation, and finally a result becomes available:

$a=b[i]+c+d;$

Only the result (the assignment to "a") has an effect on the source-visible state of the program. The instruction that performs the assignment to "a" is a data change point instruction. Other instructions derived from this statement, which might be scattered about by scheduling optimizations, are not data change point instructions.

A single source statement may have more than one data change point. For example, in the following C language statement, there two separate state changes (both "i" and "n" are changed):

$i=n++;$

In the illustrative software development system, every statement containing more than one data change point is treated as if it had a single data change point. One data change point is considered to be the most important one; that is the one that will be recorded in the mapping data. This simplification makes implementation of data change points a more straightforward addition to an existing software development system. Alternatively, each data change point instruction could be tracked, even when there was more than one for a single statement.

Although the preceding C language statement has two data change points, the update to "i" is the only data change point that the illustrative system tracks for this statement.

If "s1" and "s2" are structures with multiple fields, the following statement in the C programming language is translated into update instructions for each field:

$s1=s2;$

Ideally each of the instructions updating a field of the structure should be treated as a data change point instruction. However, in the illustrative embodiment only one of these instructions is actually tracked as a data change point instruction.

Although a procedure call does not actually contain a data change point, the illustrative embodiment treats a procedure call as having a data change point: the data change point instruction for a procedure call is the branch instruction that actually makes the subroutine call (as distinguished, for example, from any instructions that may be needed assemble arguments for the call). It is common for a user of a debugger to focus attention on one particular source module at a time. When operating in this way, the user will often direct the debugger to continue execution through procedure calls without scrutinizing program behavior during execution of the called procedure. Yet a called procedure may change variables that are visible within the calling procedure; thus, when stopping at data change point instructions, it is also appropriate to stop at a branch to a procedure.

As a convenience to the user of the debugger, the branch instruction that effects a "return" from a procedure is also treated as a data change point instruction. This is done as a convenience to the user of the debugger: for example, stepping by data change point will be assured of stopping at the end of the procedure currently being examined by the programmer, thereby permitting the programmer to observe program data before execution continues in the calling part of the program.

In general, it is desirable to make all data change points available to a user of the debugger. However, there are implementation advantages to imposing the constraint that at most one data change point is tracked for each statement. In general, when selecting one of the data change points in a statement that includes more than one, the selected data change point should signify statement completion. The illustrative system uses the following approach to selecting a data change point to track when more than one is identified in a single statement.

1. Check for source level assignments appearing outside of a parameter list. The last assignment operation executed in the statement is marked. Exit.
2. Check for function calls and inline calls. For the one found to be the last executed, do the following:
   2.1. Check call to see if it is an inline. Create a data change point in the caller's context and attach it to the first instruction of the inline (marks inline call site). Continue.
   2.2. Check call to see if it is an inline with an non-void return type. Create a data change point in the inline's context and attach it to the instruction yielding the inline's return value. Exit.
   2.3. Check call to see if it is a non-inline function call. Mark the call instruction as a data change point in the caller's context. Exit.
3. Check for side effects. Mark the instruction for the side effects that would be last executed. Exit.
4. Check for function return. Mark the return instruction as a data change point. Exit.

In this procedure, "last operation" means the last operation to be executed in the intermediate code; if an expression tree is built from the source code, the last operation is the one highest in the expression tree; for two or more at the same level, the last generated operation would be selected as the "last operation".

For languages with built-in I/O statements and other like constructs, it is up to the front-end for that particular language to define whether the I/O statement looks like a call or falls under some other category with respect to data change point marking.

Not all statements have data change points. For example, a conditional statement or a loop, switch, or other flow control statement does not itself contain a data change point, although it may contain other statements that do have data change points.

Compiler

As the compiler 102 analyzes the program to translate the source code, it also identifies and records information about the source code being analyzed and its relationship to the code that the compiler is generating. Included in this analysis is detection of data change points. For each data change point instruction, the compiler identifies the portion (or portions, if optimization has resulted in the instruction being derived from more than one statement) of the source code from which the instruction was derived. In addition, this instruction/source code mapping also includes an indication that the relationship between the instruction and the source code is a "data change point" relationship, to differentiate it from other instruction/source code mappings (such as logical lines or fragments, described below).

Figure 2:
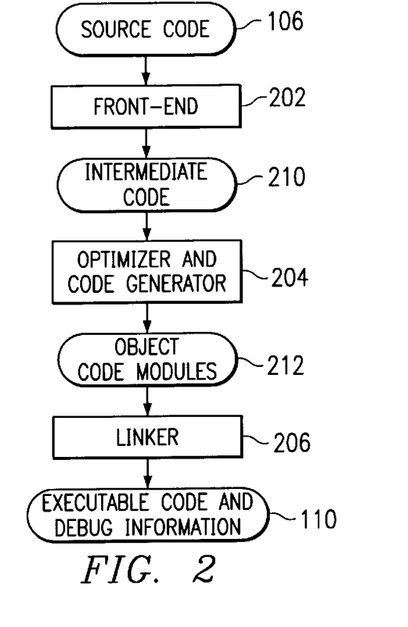
FIG. 2 is a block diagram of an illustrative compilation system.

As illustrated in FIG. 2, implementation of the illustrative compiler 102 is organized into several major parts: a front-end 202, an optimizer and code generator 204, and a linker 206.

The front-end is language-specific. There is a different front-end for each computer language (such as C or FORTRAN) to be compiled. The front-end analyzes the source code 106 and generates language-independent intermediate code 210.

The optimizer and code generator 204 receives the intermediate code form of the program 210 and performs a variety of optimizations. There are many different types of optimizations. The following example illustrates one type of optimization that changes the order in which instructions are executed: in the source code form of a program, the body of a loop may contain a statement that computes a value and assigns it to a variable; if the computation of that variable does not depend on any computation in the loop, then the optimizer may recognize that this computation and assignment can be moved so that it is performed prior to entry of the loop. This optimization increases performance because fewer computations are performed (the value is not recomputed on each pass through the loop).

The optimizer and code generator 204 also translates the intermediate code 210 into code for a specific computer architecture. The output of this process are object modules 212 that still include values that are expressed as symbols, and not as the numeric values suitable for direct execution by the target computer system. The linker 206 takes a collection of object modules 212 and prepares them for loading and execution on the target machine. The linker's 206 tasks include providing actual addresses and reconciling symbols across the set of modules 212 being "linked".

The front-end 202 analyzes the source code to identify data change points. The front-end marks those operations in the intermediate code that are data change points and identifies the portions of the source code that correspond to those operations.

This data change point information is then tracked through the optimization and code generation process. If a transformation eliminates an instruction that was marked as a data change point, then the compiler must determine if the data change point is eliminated or if it is transferred to a new instruction. For example, if a variable update is eliminated because it is unused, then the data change point itself is also eliminated; on the other hand, if a variable assignment is eliminated (e.g., it is a constant or it is identical to the assignment of another variable), then the data change point must be transferred from the original instruction to the new instruction, such as is illustrated in the following example, beginning with the following two lines of source code (where 'a' is not changed by any of the statements executed between lines 15 and 32):

15 a=10;

<other statements, but none that change 'a'>

32 y=a;

From this source code, the compiler could generate code that represents the following instructions before optimization:

Store 10, a<data change point for source line 15>

<. . . >

Store a, y<data change point for source line 32>and the following instructions after optimization:

<instruction deleted >

<. . . >

Load 10, tmp<data change point for source line 15>

Store tmp, y<data change point for source line 32>

The optimizer and code generator 204 stores its output data in object modules 212. The data in these object modules identifies data change point instructions and provides the mapping back to the source code 106. The linker 206 puts this data change point mapping information into the file that it generates containing the executable code 110, thereby making this information available to the debugger 104 (by means of the executable code managers 408, described below in connection with FIG. 4).

A user of the compiler 102 can control the extent of the optimization performed, including disabling optimization. Because data change point information is intended to address problems in debugging optimized code, the compiler does not need to generate data change point mapping data when optimization is turned off. Also, the compiler may not be able to track every data change point. If a user of the debugger refers to a data change point for which the debugger cannot find mapping data, the debugger simply provides an appropriate warning to the user.

Mapping Data

Figure 3:
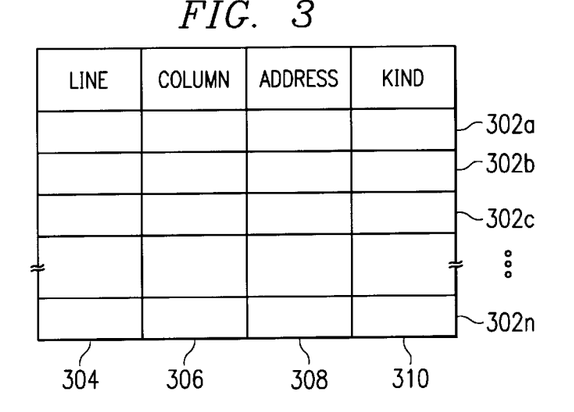
FIG. 3 is a diagram of a data structure in which correspondences between portions of source code and data change point instructions are stored.

The logical structure for storing mapping data is a set of tables, one table for each module of source code. FIG. 3 illustrates the structure of these logical tables in which mapping data is stored. The table can be viewed as a set of records, each of which has a set of fields; in FIG. 3, these are shown as rows and columns, respectively. Each row 302 (e.g., 302a, 302b, 302c, . . . 302n) of the table stores data for one source code/machine instruction correspondence. The portion of source code within the module is identified by the line number (in column 304) and the column number (in column 306) in the source module at which that portion of source code starts. The machine instruction is identified by its address (in column 308). The type of mapping is stored in the "kind" column 310. Whereas software development systems that represent only a single mapping between source and machine instructions do not need a "kind" field 310, the illustrative software development system includes several types of mapping: data change point, fragment, and logical line.

Fragment mapping tracks the location of each of the groups of contiguous instructions derived from a particular source statement. Logical line mapping follows the execution point in the abstract graph of the source program, rather than exactly what machine instruction is being executed. A logical line is an identifier of a location in the machine code that structurally corresponds to the designated source line. Fragment mapping and logical line mapping are described in U.S. patent application Ser. No. 8/387,054, filed Feb. 2, 1995, "Source line tracking in optimized code", assigned to the assignee of the present application.

While FIG. 3 illustrates the logical structure of the storage for mapping data, one skilled in the art will appreciate that various techniques can be used for physically organizing mapping data for efficient storage and/or processing. For example, rather than having a "kind" value for each mapping record, this field could be stored implicitly, such as by grouping the mapping data according to "kind". While the line and column fields of the table of FIG. 3 identify the start of the relevant portion of source code, the end is implicit, based on the beginning of other source code portions; alternatively, the length or end position could be explicitly stored. U.S. Pat. No. 5,339,431, Rupp, et al., "Software compiler and linker with improved line-number table" describes one particular approach to storing mapping data.

Figure 4:
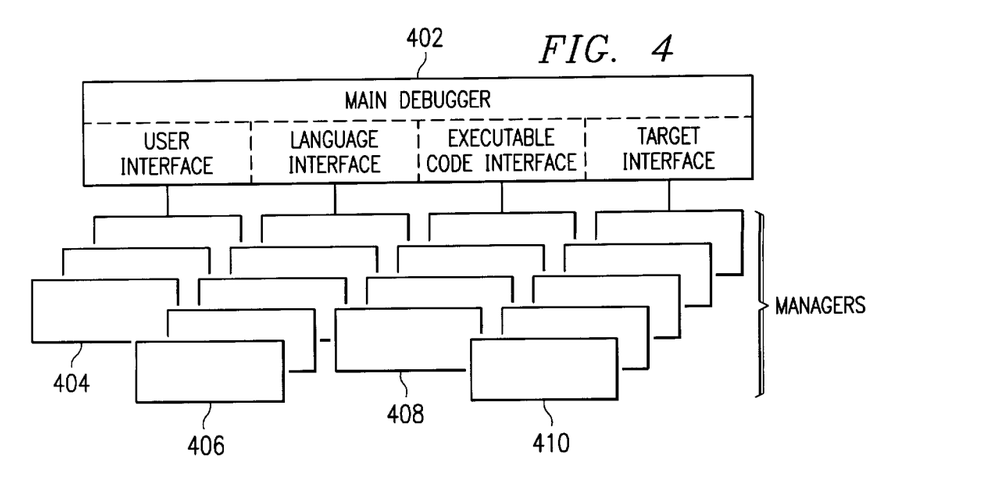
FIG. 4 is a block diagram of an illustrative debugger.

In the illustrative system, the compiler stores the mapping data 110 in the file that contains the executable code. Alternatively, the mapping data may be stored in a separate file from the file in which the executable code is stored. An executable code manager 408 extracts the mapping data from that file and passes the data to the main debugger 402, which uses its own mechanism for storing the mapping data during a debugging session. However, use of a file system to store this information for communication from the compiler to the debugger is not necessary to the practice of the invention. The mapping data could be stored and communicated from the compiler to the debugger in other ways, such as by streams or by "objects" (in the sense of object-oriented programming).

Debugger

General characteristics (but not including support for data change points) of the user interface and the overall architecture of the illustrative debugger are described in A. K. Iyengar, et al., "An event-based, retargetable debugger", Hewlett-Packard Journal, December 1994, pp. 33–43.

As shown in FIG. 4, the illustrative debugger 104 is implemented as a main debugger 402 and a collection of managers 404, 406, 408, 410 that communicate with the main debugger 402, but not with each other. These managers include user interface managers 404, language managers 406, executable code managers 408, and target managers 410.

Several user interface managers 404 may be provided. The user interface manager of the illustrative embodiment presents is a graphical user interface. This interface provides a number of different windows, such a transcript window, source code window, and command window. The user can enter commands to control the debugger by use of menus (including context-sensitive pop-up menus) and buttons, in addition to conventional typed commands.

A language manager 406 is responsible for the language-specific aspects of a debugging session. For example, the language managers 406 are used when evaluating and printing expressions. There are managers 406 for several different high level languages and for several different assembly languages.

An executable code manager 408 is responsible for converting symbolic debug information generated by compilers into the main debugger's internal symbol table format. There are different executable code managers 408 for different compiler-generated symbol table formats.

A target manager 410 is responsible for providing debugger functionality specific to the platform (e.g., hardware, operating system, and run-time libraries) on which the target program is executed; debugging of a target program executing on a remote system is supported. The target manager's 410 primary responsibility is to control execution of the program being debugged and report the state of that program to the main debugger. There are different target managers 410 for different platforms.

Debugger Commands

The debugger accepts a number of different commands that can be executed with the "-critical" switch, for example:

breakpoint <statement ID> -critical
delete breakpoints -critical
step -critical
step -until <statement ID> -critical
trace -critical
go -until <statement ID> -critical
goto<statement ID> -critical The command breakpoint <statement ID> -critical sets a breakpoint at the data change point instruction for the identified statement. The command delete breakpoints -critical deletes breakpoints of the "data change point" type.

The command step -critical continues program execution until any instruction that is a data change point is encountered. The command step -until <statement ID> -critical continues program execution until the data change point instruction corresponding to <statement ID> is encountered; statements whose data change point is executed during such execution will be highlighted, if the highlighting feature is turned on.

The command trace -critical enables the program trace function such that it reports information relating to execution of data change point instructions.

The command go -until <statement ID> -critical continues program execution until the data change point instruction corresponding to <statement ID> is encountered; execution of data change point instructions in response to a "go" command does not result in highlighting of the corresponding source statements.

The command goto <statement ID> -critical continues program execution at the data change point instruction corresponding to <statement ID>.

The debugger also accepts the "-fragment" switch on certain commands. For example, the command breakpoint <statement ID> -fragment sets breakpoints at each instruction that is the first instruction in each group of contiguous instructions that are derived from the identified source statement.

The debugger also permits the user to set a breakpoint at specific assembly language instruction:

breakpoint 'va(<instruction address>)

It is possible for the user to set more than one breakpoint on a single instruction. For example, the instruction that is the data change point could also be the first instruction in a "fragment"; in addition, the user could refer to the assembly language and directly specify the instruction. These different breakpoints can each be separately suspended. Deleting one will not delete the others. A list of the breakpoints will identify each of these breakpoints even though they all refer to the same machine instruction.

Debugger Display

One of the difficulties in debugging optimized code is that the program's instructions are not necessarily executed in the order that they appear in the source code listing. Thus, when execution has been suspended, statements that precede the current execution point in the source code may not have executed yet. This makes it risky for a user of a debugger to rely on observations of the results of those statements. The illustrative debugger 104 uses the information that it has concerning data change points to help alleviate this problem: the debugger can highlight source statements for which the data change point instruction has executed.

The following commands are available to users of the debugger:

property highlight on
property highlight off
unhighlight

The first enables highlighting of source statements for which the data change point instruction has executed, the second disables such highlighting, and the third command removes the highlighting of the currently highlighted source statements.

A statement whose data change point executes multiple times is highlighted by reverse video the first time and highlighted by underlining after the second execution. Subsequent execution of that data change point will cause the highlighting of the corresponding source statement to alternate between the two forms of highlighting. Other, more complex highlighting schemes could be used, such as using color sequences or by explicitly indicating execution count.

In the illustrative debugger, the portion of source code highlighted is the portion identified in the mapping data.

Alternatively, the debugger could be designed to highlight the entire line on which the relevant portion begins, or give some other indication that draws the user's attention to the relevant portion of source code.

In general, the debugger cannot determine whether a particular instruction has executed without stepping execution through the relevant instructions. Such stepping incurs a great deal of computing overhead. Although a debugger could be designed to do the necessary stepping whenever highlighting is "on", or various mechanisms could be provided for a user of the debugger to control this tradeoff between performance and highlighting. In the illustrative embodiment, the debugger only highlights statements when a user directs it to "step" through the corresponding data change point. Thus, when highlighting is "on", the user controls the extent to which the highlighting capability is used by controlling program execution, such as by use of the "step" and "go" commands. A user can use the "go" command to move execution to where highlighting should begin, and then use the "step" command to move through the portion of the program for which the highlighting is expected to be helpful.

A user can use the following command to direct the debugger to execute continuously until some particular location is reached while highlighting (if the highlighting feature is turned on) statements whose data change points have been executed:

step -critical -until <statement ID>

This command will stop execution at the data change point instruction identified by <statement ID>, and will highlight statements whose data change point instructions are executed prior to stopping at <statement ID>. As another example, step -critical -count 10 would stop at the tenth data change point instruction, highlighting statements whose data change points have been executed on the way to that tenth data change point instruction.

The debugger displays marks, known as execution point marks, indicating the correspondence between source statements and the machine instruction that is about to execute. This correspondence is indicated for each of the following models of location mapping:

logical line: where the program is in terms of basic block structure;

fragment: the instruction about to execute comes from this statement or these statements;

data change point: the instruction about to execute comes from this statement or these statements and is a data change point for this statement or these statements.

Not all of these types of location mapping are available for every statement under every kind of optimization. When mapping information is not available, the corresponding mark is not displayed. If the user explicitly requests a type of location for which mapping data is not available, a warning will be given.

The execution point marks are displayed to the left of the relevant source code line. On a line with more than one statement, various techniques can be used to identify the statement to which the mark applies—for example, color coding, different shapes of marks. The illustrative debugger uses the approach of a using a variant on the basic mark if the statement to which it applies is not the first statement on the line.

Figure 5A:
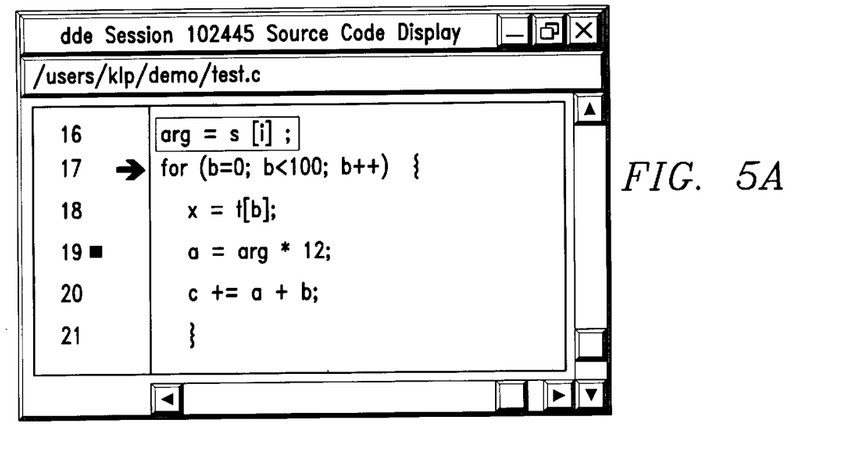
FIGS. 5A and 5B each show a portion of a screen display presented by the illustrative debugger.
Figure 5B:
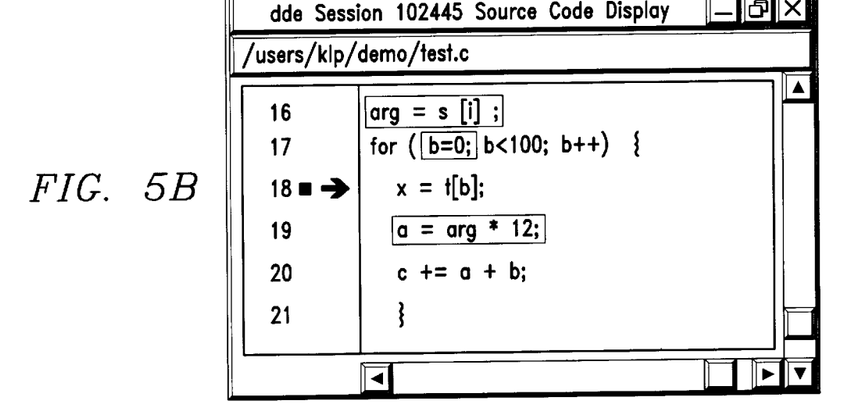

FIGS. 5A and 5B each show an example of a source display window presented by the illustrative debugger 104. For the purpose of this example, assume that the compiler has recognized that line 19 does not depend on any computation in the loop, and thus the instructions derived from line 19 have been moved immediately preceding the loop entry (line 17).

FIG. 5A shows the display after the following debugger command (while data change point highlighting is enabled):

step -until 19 -critical

The logical line execution point is indicated by an arrow at line 17, while the data change point execution point is indicated by a square at line 19. Line 16 is highlighted, because the data change point on that line has been executed.

If the user then issues the following command:

step -until 18 -critical then the display will change to that shown in FIG. 5B, which shows both the logical line execution point and the data change execution point at line 18. In addition, FIG. 5B shows line 19 and a portion of line 17 highlighted because data change point instructions on these lines have been executed. Line 18 is not highlighted because execution has stopped at its data change point instruction, which has not yet been executed. Alternatively, line 17 could be highlighted in its entirety; however, it is generally desirable to identify the relevant portion of the source code with as much specificity as possible.

The debugger's display of the assembly language representation of the program is also enhanced with information relating to data change points. Each machine instruction is followed by a list of the line numbers of the source statements from which the instruction is derived. If the instruction is a data change point, the corresponding line number(s) is/are highlighted.

The foregoing has described a specific embodiment of the invention. Additional variations will be apparent to those skilled in the art. For example, although the invention has been described in the context of a debugger, other software development tools could be usefully adapted to use data change points; a performance measurement tool could be designed to collect and display data relating execution at data change points. Thus, the invention is not limited to the specific details and illustrative example shown and described in this specification. Rather, it is the object of the appended claims to cover all such variations and modifications as come within the true spirit and scope of the invention.

We claim:

1. A software development system comprising:

(A) a mapping data structure for storing data identifying correspondences between portions of source code and machine instructions of a program, and including data identifying, out of a plurality of machine instructions that correspond to a portion of source code, those particular machine instructions that are data change point instructions;

(B) a compiler that identifies machine instructions that are data change points of portions of source code and stores data in the mapping data structure that identifies such correspondences between machine instructions that are data change point instructions and the portions of source code to which they correspond; and (C) a debugger that retrieves data from the mapping data structure, including the data identifying data change point instructions, and uses that data to control execution of the program such that, in response to a command from a user of the debugger, execution of the program is stopped at a data change point instruction.

2. The software development system of claim 1 wherein the debugger provides a mechanism for setting a breakpoint at a data change point instruction in response to a command by a user of the debugger in which the user specifies a portion of the source code and specifies that a breakpoint should be set at a data change point instruction.

3. The software development system of claim 1 wherein the debugger provides a mechanism for stepping execution of the program to the next data change point instruction.

4. The software development system of claim 1 wherein the debugger includes means for displaying source code of the program and for highlighting portions of the source code for which the corresponding data change point instructions have executed.

5. A debugger comprising:
(A) means for receiving data identifying correspondences between portions of source code of a program and machine instructions in a translated representation of the program, and data identifying, out of a plurality of machine instructions that correspond to a portion of source code, those particular machine instructions that are data change point instructions;
(B) means for controlling execution of the program such that, in response to a command from a user of the debugger, the data identifying data change point instructions is used so that execution of the program is stopped at a data change point instruction.

6. The debugger of claim 5 further comprising:
(C) user interface means by which a user can identify a portion of source code of a program and can select a type of breakpoint, the type being one of a plurality of predetermined breakpoint types;
(D) means responsive to a user's selection of a particular one of the breakpoint types to set a breakpoint on a machine instruction that is the data change point for the identified portion of source code.

7. The debugger of claim 5 wherein the means for controlling execution of the program includes a mechanism for stepping execution of the program to the next data change point instruction.

8. A debugger comprising:
(A) means for receiving data identifying correspondences between portions of source code of a program and machine instructions in a translated representation of the program, and data identifying, out of a plurality of machine instructions that correspond to a portion of source code, those particular machine instructions that are data change point instructions;
(B) means for displaying source code of the program and for using the data identifying data change point instructions to highlight portions of the source code for which the corresponding data change point instructions have executed.

9. The debugger of claim 8 further comprising means for removing the highlighting in response to a command by a user of the debugger to remove executed data change point highlighting.

10. A software development tool comprising:
(A) means for receiving data identifying correspondences between portions of source code of a program and machine instructions in a translated representation of the program, and data identifying, out of a plurality of machine instructions that correspond to a portion of source code, those particular machine instructions that are data change point instructions;
(B) means for controlling execution of the program so as to be able to collect data about the program's execution;
(C) means for using the data identifying data change point instructions in the collection and storage of data about the program's execution of data change point instructions.

11. A compiler comprising:
(A) means for receiving a source code representation of a program defining an abstract machine;
(B) means for translating the source code representation into a second representation of the program, the second representation defining translated instructions for implementing the abstract machine on a pre-existing machine;
(C) to identify correspondences between translated instructions and portions of the source code representation;
(D) means for identifying particular translated instructions that change the state of the abstract machine;
(E) means for generating data identifying correspondences between portions of the source code representation and the translated instructions, and data identifying, out of a plurality of machine instructions that correspond to a portion of the source code representation, those particular translated instructions that were identified as changing the state of the abstract machine.

12. The compiler of claim 11 wherein the compiler includes means for identifying a plurality of different types of correspondences between instructions and portions of source code, and wherein the generated mapping data indicates the type of each identified correspondence.

13. The compiler of claim 11 wherein the source code is expressed in a statement-oriented language and the identified portions of source code are statements, wherein the instructions that change the state of the abstract machine are known as data change point instructions, and wherein, even for a statement from which more than one data change point instruction is derived, the compiler generates mapping data for at most one correspondence between such statement and a data change point instruction.

14. A computer-readable memory configured so that it can be used to direct a computer:
(A) to receive a source code representation of a program defining an abstract machine;
(B) to translate the source code representation into a second representation of the program, the second representation defining translated instructions for implementing the abstract machine on a pre-existing machine;
(C) to identify correspondences between translated instructions and portions of the source code representation;
(D) to identify particular translated instructions that change the state of the abstract machine;
(E) to generate data identifying correspondences between portions of the source code representation and the translated instructions, and data identifying, out of a plurality of machine instructions that correspond to a portion of the source code representation, those particular translated instructions that were identified as changing the state of the abstract machine.

15. The computer-readable memory of claim 14 wherein the memory is further configured to direct a computer to identify a plurality of different types of correspondences between instructions and portions of source code, and wherein the generated mapping data indicates the type of each identified correspondence.

16. The computer-readable memory of claim 14 wherein the source code is expressed in a statement-oriented language and the identified portions of source code are statements, wherein the instructions that change the state of the abstract machine are known as data change point instructions, and wherein, even for a statement from which more than one data change point instruction is derived, the generated mapping data includes at most one correspondence between such statement and a data change point instruction.

17. A computer-readable memory configured so that it can be used to direct a computer:

(A) to receive data identifying correspondences between portions of a source code representation of a program and machine instructions in a translated representation of the program, and data identifying, out of a plurality of machine instructions that correspond to a portion of source code, those particular machine instructions that are data change point instructions;

(B) to control execution of the program such that, in response to a command from a user of the computer, the data identifying data change point instructions is used so that execution of the program is stopped at a data change point instruction.

18. The computer-readable memory of claim 17 wherein the memory is further configured to direct a computer:

(C) to present a user of the computer with means by which the user can identify a portion of source code of the program and can select a type of breakpoint, the type being one of a plurality of predetermined breakpoint types;

(D) to respond to the user's selection of a particular one of the breakpoint types to set a breakpoint on a machine instruction that is the data change point for the identified portion of source code.

19. The computer-readable memory of claim 17 wherein the memory is further configured to direct a computer to control execution of the program such that, in response to a command from a user of the computer, execution of the program is stepped to the next data change point instruction.

20. The computer-readable memory of claim 17 wherein the memory is further configured to direct a computer to display source code of the program and to highlight portions of the source code for which the corresponding data change point instructions have executed.

* * * * *